(12) United States Patent
Bauman et al.

(10) Patent No.: US 7,614,616 B2
(45) Date of Patent: Nov. 10, 2009

(54) GAS SPRING ASSEMBLY WITH SELECTABLE INTERMEDIATE STOP

(75) Inventors: Walter Douglas Bauman, Wixcom, MI (US); Mark M. Rose, Myrtle Beach, SC (US)

(73) Assignee: AVM Industries, LLC, Marion, SC (US)

( * ) Notice: Subject to any disclaimer, the term of this patent is extended or adjusted under 35 U.S.C. 154(b) by 512 days.

(21) Appl. No.: 11/154,778

(22) Filed: Jun. 16, 2005

(65) Prior Publication Data

US 2006/0284354 A1   Dec. 21, 2006

(51) Int. Cl.
*F16F 5/00*     (2006.01)
*F16F 9/00*     (2006.01)

(52) U.S. Cl. .................... 267/120; 267/64.12; 267/284; 188/267

(58) Field of Classification Search .................. 267/120, 267/124, 129, 64.2, 64.12, 284; 188/319.2, 188/267, 299.1, 284
See application file for complete search history.

(56) References Cited

U.S. PATENT DOCUMENTS

| | | | | |
|---|---|---|---|---|
| 1,034,347 A | * | 7/1912 | Guatave | 264/608 |
| 2,891,637 A | * | 6/1959 | Cameron | 188/267 |
| 4,045,008 A | * | 8/1977 | Bauer | 267/120 |
| 4,066,279 A | * | 1/1978 | Kaptanis | 267/64.11 |
| 4,623,132 A | * | 11/1986 | Smith | 267/34 |
| 4,909,488 A | * | 3/1990 | Seibert et al. | 267/64.11 |
| 5,040,645 A | * | 8/1991 | Volpel et al. | 188/287 |
| 5,090,770 A | * | 2/1992 | Heinrichs et al. | 297/344.19 |
| 5,157,806 A | * | 10/1992 | Wartian | 16/66 |
| 5,174,557 A | * | 12/1992 | Meier | 270/38 |
| 5,269,398 A | * | 12/1993 | Wolf et al. | 188/300 |
| 5,702,091 A | * | 12/1997 | Perrin et al. | 267/64.12 |
| 5,722,643 A | * | 3/1998 | Chamberlin et al. | 267/120 |
| 5,839,719 A | * | 11/1998 | Hosan et al. | 267/64.12 |
| 5,947,238 A | * | 9/1999 | Jolly et al. | 188/267.2 |
| 6,356,071 B1 | * | 3/2002 | Koski et al. | 324/207.13 |
| 6,415,895 B2 | * | 7/2002 | Marking et al. | 188/287 |
| 6,634,627 B1 | * | 10/2003 | Stevenson | 267/64.12 |
| 2003/0006539 A1 | * | 1/2003 | Bertram et al. | 267/120 |
| 2004/0262828 A1 | | 12/2004 | Bauman | |

FOREIGN PATENT DOCUMENTS

| | | | |
|---|---|---|---|
| DE | 3612752 | * | 10/1987 |
| GB | 1034347 | * | 6/1966 |
| WO | WO 03/014590 A2 | | 2/2003 |

* cited by examiner

*Primary Examiner*—Robert A Siconolfi
*Assistant Examiner*—Mahbubur Rashid
(74) *Attorney, Agent, or Firm*—Carlson, Gaskey & Olds

(57) ABSTRACT

A gas spring assembly is used to control movement of a vehicle body panel. The gas spring assembly includes a magnetic collar that allows an end user to position an intermediate stop position at a desired location. The magnetic collar is externally supported on a tube of the gas spring assembly. The end user selectively adjusts the intermediate stop position by moving the magnetic collar relative to the tube. The gas spring assembly includes a piston that is received within the tube and connected to a rod. The rod moves relative to the tube between a fully extended position and a fully compressed position. The magnetic collar includes a magnet that cooperates with the piston assembly to stop and hold the vehicle body panel at the intermediate stop position as the rod moves from the fully compressed position toward the fully extended position.

23 Claims, 6 Drawing Sheets

GAS SPRING ASSEMBLY WITH SELECTABLE INTERMEDIATE STOP

TECHNICAL FIELD

The subject invention relates to a gas spring assembly that includes an adjustable intermediate stop position.

BACKGROUND OF THE INVENTION

Gas spring assemblies are used to control movement of one component relative to another component. In one example, a gas spring assembly is used to control movement of a vehicle body panel, such as a liftgate or trunk cover, relative to a vehicle body member. The gas spring assembly is moveable between a fully extended position and a fully compressed position, and sometimes includes at least one intermediate stop position.

The intermediate stop position is set at a position that is usually midway between the fully extended and fully compressed positions. One disadvantage with current gas spring designs is that the intermediate stop position is set at a specific location by a manufacturer during an initial design phase, and cannot be subsequently adjusted to other locations. This is disadvantageous because an end user cannot set the intermediate stop position at a desired location. The intermediate stop position selected by manufacturer may be too high for shorter end users or too low for taller end users.

Thus, there is a need for a gas spring assembly that includes an adjuster mechanism that allows an end user to selectively adjust the position of the intermediate stop position.

SUMMARY OF THE INVENTION

A gas spring assembly is used to control movement of a vehicle panel relative to a vehicle body member. The gas spring assembly includes a tube that receives a piston assembly. The piston assembly divides the tube into extension and compression chambers. A rod is connected to the piston assembly such that the rod and piston assembly move together within the tube between a fully extended position and a fully compressed position. The gas spring assembly includes an external adjuster mechanism that allows an end user to selectively set an intermediate stop position at a desired location between the fully extended and compressed positions.

The external adjuster mechanism is preferably comprised of a magnetic collar that is supported by an external surface of the tube. The end user selectively adjusts a position of the magnetic collar relative to the tube to change the intermediate stop position as needed. The piston assembly includes a magnetic valve member that cooperates with a magnet in the magnetic collar to complete the magnetic circuit to stop and hold the gas spring assembly at the intermediate stop position.

As the gas spring assembly is moved from the fully compressed position toward the fully extended position, the magnetic valve member passes through the magnetic collar causing the magnetic valve member to close. This valve closure prevents gas from flowing from the extension chamber into the compression chamber and stops the gas spring assembly at the intermediate stop position. The end user can then exert a manual input force to generate a high pressure on a rod side of the piston assembly. After sufficient pressure is generated, the magnetic valve member is forced open and the piston assembly moves against a magnetic field generated between the magnetic collar and magnetic valve member.

When the gas spring is moved from the fully extended position toward the fully compressed position, a bypass flow path allows the gas spring assembly to avoid stopping in the intermediate stop position. The piston assembly includes a shuttle disc and orifice plate that cooperate to provide the bypass flow path through the piston assembly.

The subject invention provides an adjuster mechanism for a gas spring assembly that allows an end user to selectively adjust the location of an intermediate stop position. These and other features of the present invention can be best understood from the following specification and drawings, the following of which is a brief description.

DETAILED DESCRIPTION OF THE PREFERRED EMBODIMENT

Figure 1:
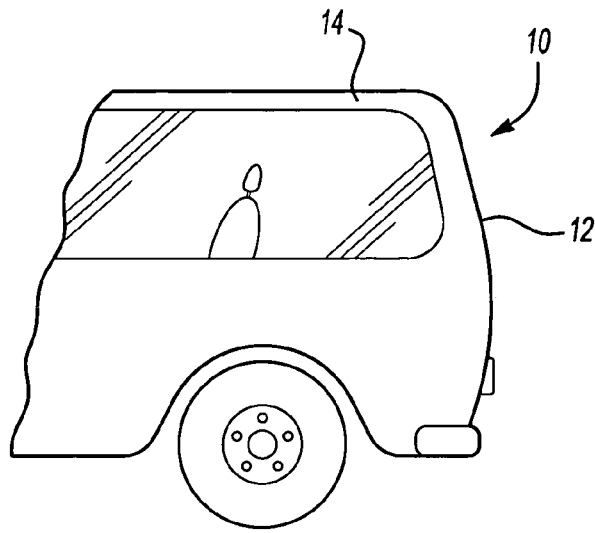
FIG. 1 shows a schematic representation of one example of a vehicle configuration that utilizes a gas spring assembly incorporating the subject invention where a vehicle liftgate is in a fully closed position.
Figure 2:
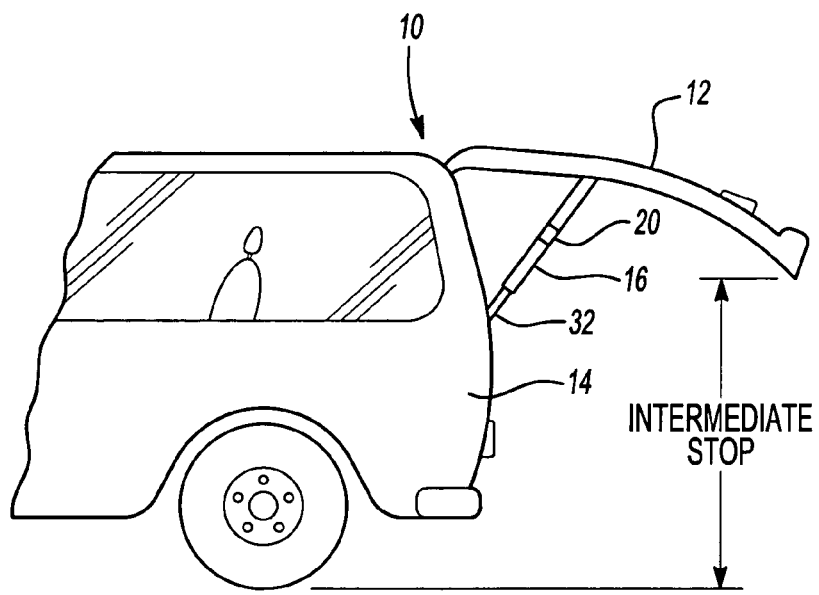
FIG. 2 is similar to FIG. 1 but shows the vehicle liftgate at an intermediate stop position.
Figure 3:
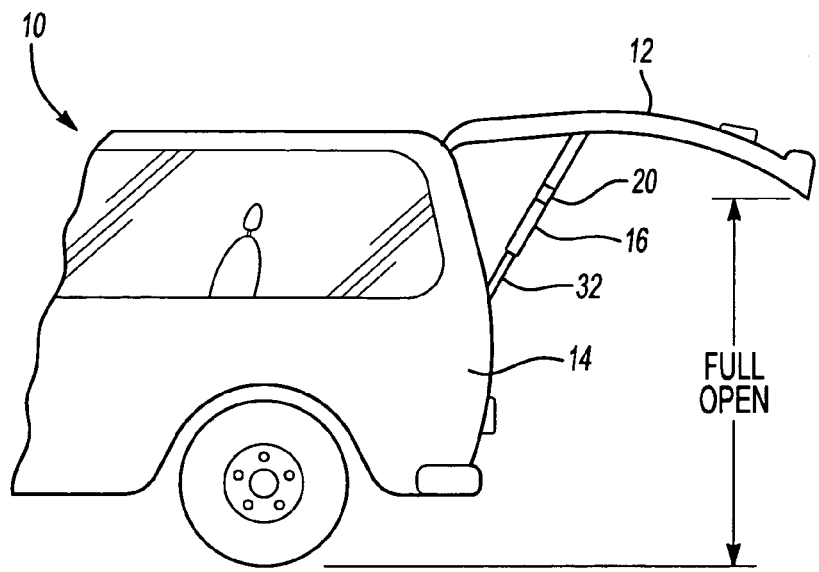
FIG. 3 is similar to FIG. 1 but shows the vehicle liftgate in a fully open position.

A vehicle 10 includes a liftgate 12 that is movable relative to a vehicle body 14. FIG. 1 shows the liftgate 12 in a fully closed position. At least one gas spring assembly 16, shown in FIG. 2, is used to control movement of the liftgate 12 relative to the vehicle body 14. The gas spring assembly 16 is movable between a fully compressed position (FIG. 1) and a fully extended position (FIG. 3).

The gas spring assembly 16 also includes at least one intermediate stop position that is located between the fully compressed and fully extended positions. FIG. 2 shows the liftgate 12 at an intermediate stop position. The gas spring assembly 16 includes an adjuster 20 that allows an end user to selectively set the intermediate stop position at a desired location. The adjuster 20 can be selectively moved between various positions to adjust the intermediate stop position as needed for different end users. This will be discussed in greater detail below.

While only one gas spring assembly 16 is shown in FIG. 2, it should be understood that more than one gas spring assembly 16 could be utilized to control movement of the liftgate 12. Further, the liftgate 12 shown in FIGS. 1-3 is just one example of a vehicle configuration that could utilize the gas spring assembly 16 incorporating the subject invention. The gas spring assembly 16 could also be used to control movement of vehicle hoods, trunks, hatches, lids, etc.

The gas spring assembly 16 is shown in greater detail in FIGS. 4-7. The gas spring assembly 16 includes a tube 22, a piston assembly 24 received within the tube 22, and a rod 26 connected to the piston assembly 24. The piston assembly 24 separates an interior cavity of the tube 22 into an extension chamber 28 and a compression chamber 30. The piston assembly 24 controls gas flow between the compression 30 and extension 28 chambers as the rod 26 moves between fully extended and fully compressed positions.

The rod 26 includes a first end 32 that extends outwardly from the tube 22 (FIGS. 2-3) and a second end 34 that is coupled to the piston assembly 24. The second end 34 includes a rivet 36 that is preferably formed as a single piece with the rod 26, however, a separate rivet could be separately attached to the rod 26. The rivet 36 includes a shaft portion 38 and an enlarged head portion 40. The shaft portion 38 extends from the second end 34 of the rod 26. The rod 26 has a shaft body 42 that has a larger diameter than the shaft portion 38, creating a shoulder portion 44 that transitions from the shaft body 42 of the rod 26 to the shaft portion 38 of the rivet 36. The piston assembly 24 is held in place on the rod 26 between the shoulder portion 44 and the enlarged head portion 40 of the rivet 36.

The piston assembly 24 includes a magnetic valve member 50, an orifice plate 52, and a spacer ring 54 that are all fixed to the shaft portion 38 of the rivet 36. The piston assembly 24 also includes a shuttle disc 56 and an intermediate stop plate 58 that move relative to the shaft portion 38 of the rivet 36. The intermediate stop plate 58 is resiliently coupled to one side of the orifice plate 52. In the example shown, the intermediate stop plate 58 is coupled to the orifice plate 52 with a spring element 60. Preferably, three (3) spring elements 60 are used (only two are shown), however more or less spring elements 60 could be used.

The rod 26 defines a longitudinal axis 62. The orifice plate 52 is axially spaced apart from the magnetic valve member 50 along the longitudinal axis 62 such that a gap 64 is formed between an end of the magnetic valve member 50 and a first side 66 of the orifice plate 52. One end of the spacer ring 54 abuts against a second side 68 of the orifice plate 52 opposite from the first side 66. An opposite end of the spacer ring 54 abuts against the enlarged head portion 40 of the rivet 36. The spacer ring 54 helps to position the orifice plate 52 at a desired location relative to the magnetic valve member 50.

The orifice plate 52 includes openings 70 that extend from the first side 66 of the orifice plate 52 through to the second side 68 of the orifice plate 52. The first side 66 of the orifice plate 52 includes a first abutment surface 72 that engages the shuttle disc 56 and the second side 68 includes a second abutment surface 74 that engages the intermediate stop plate 58. When the intermediate stop plate 58 is held against the second abutment surface 74, the openings 70 in the orifice plate are closed at the second side 68.

The orifice plate 52 also includes pocket recesses 76 that receive the spring elements 60. When the intermediate stop plate 58 is held against the second abutment surface 74, the spring elements 60 are compressed within the pocket recesses 76. Optionally, the pocket recesses 76 could be eliminated and the spring elements 60 could be positioned within the openings 70. In this configuration, the openings 70 would include a ledge or lip (not shown) that would serve as a spring seat.

The magnetic valve member 50 includes a base portion 80 that is located adjacent to the shoulder portion 44 of the rod 26, and a stem portion 82 that extends from the base portion 80 toward the orifice plate 52. The base portion 80 has a slightly smaller diameter than an inner diameter of the tube 22 such that a gap 84 is created between and inner surface of the tube 22 and an outer surface of the magnetic valve member 50. The stem portion 82 has a significantly smaller diameter than the base portion 80 such that a cavity 86 is formed between the base portion 80, the stem portion 82, the inner surface of the tube 22, and the shuttle disc 56. A seal 88, such as an O-ring for example, is received within the cavity 86. The seal 88 moves with the shuttle disc 56 to direct gas flow between the extension 28 and compression 30 chambers. This will be discussed in greater detail below.

One of the rod 26 and the tube 22 is mounted to one of the vehicle body 14 and liftgate 12 and the other of the rod 26 and tube 22 is mounted to the other of the vehicle body 14 and liftgate 12. As discussed above, the gas spring assembly 16 includes an adjuster 20 that allows an end user to selectively adjust the position of an intermediate stop position for the liftgate 12. As shown in FIG. 3, the adjuster 20 comprises a magnetic collar 90 that is supported externally on the gas spring assembly 16. The magnetic collar 90 comprises a steel sleeve around a magnet 91. In the example shown, the magnetic collar 90 surrounds an outer surface of the tube 22. The magnetic collar 90 cooperates with the piston assembly 24 to complete a magnetic circuit to stop and hold the gas spring assembly 16 in the intermediate stop position as the liftgate 12 is moved from a fully closed position toward a fully open position.

Figure 4:
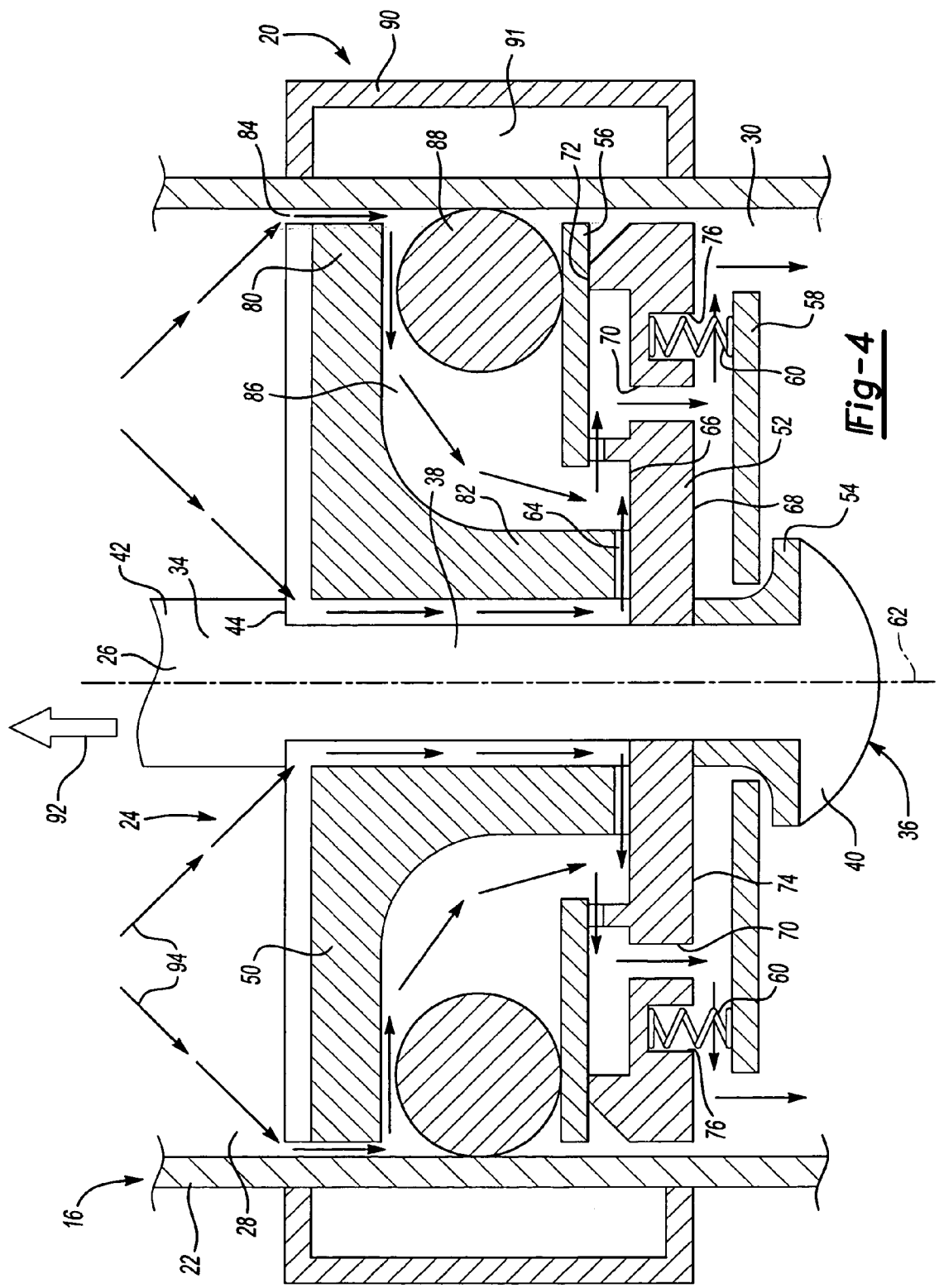
FIG. 4 is a schematic view, partially cut-away, of a gas spring assembly incorporating the subject invention that shows the gas spring assembly in an extension position with a piston valve being in an open position.

The gas spring assembly 16 and adjuster 20 operate in the following manner. FIG. 4 shows the rod 26 being moved toward an extended position, as indicated by arrow 92 with the magnetic valve member 50 being in an open position. Gas flows from the extension chamber 28 to the compression chamber 30 along a first flow path as indicated by the arrows 94.

As shown, the gas flows from the extension chamber 28 into gap 84, through cavity 86, between stem portion 82 and shuttle disc 56, between shuttle disc 56 and the first side 66 of orifice plate 52, through openings 70, between the second side 68 of orifice plate 52 and intermediate stop plate 58, and around an outer surface of the intermediate stop plate 58 into the compression chamber 30. Gas also flows from the extension chamber 28 between an outer surface of the shaft portion 38 of the rivet 36 and in inner surface of the stem portion 82 into gap 64, and then joins gas flowing from the cavity 86 into the openings 70 in the orifice plate 52. The seal 88 is moved away from the base portion 80 of the magnetic valve member 50 to provide access into cavity 86.

Figure 5:
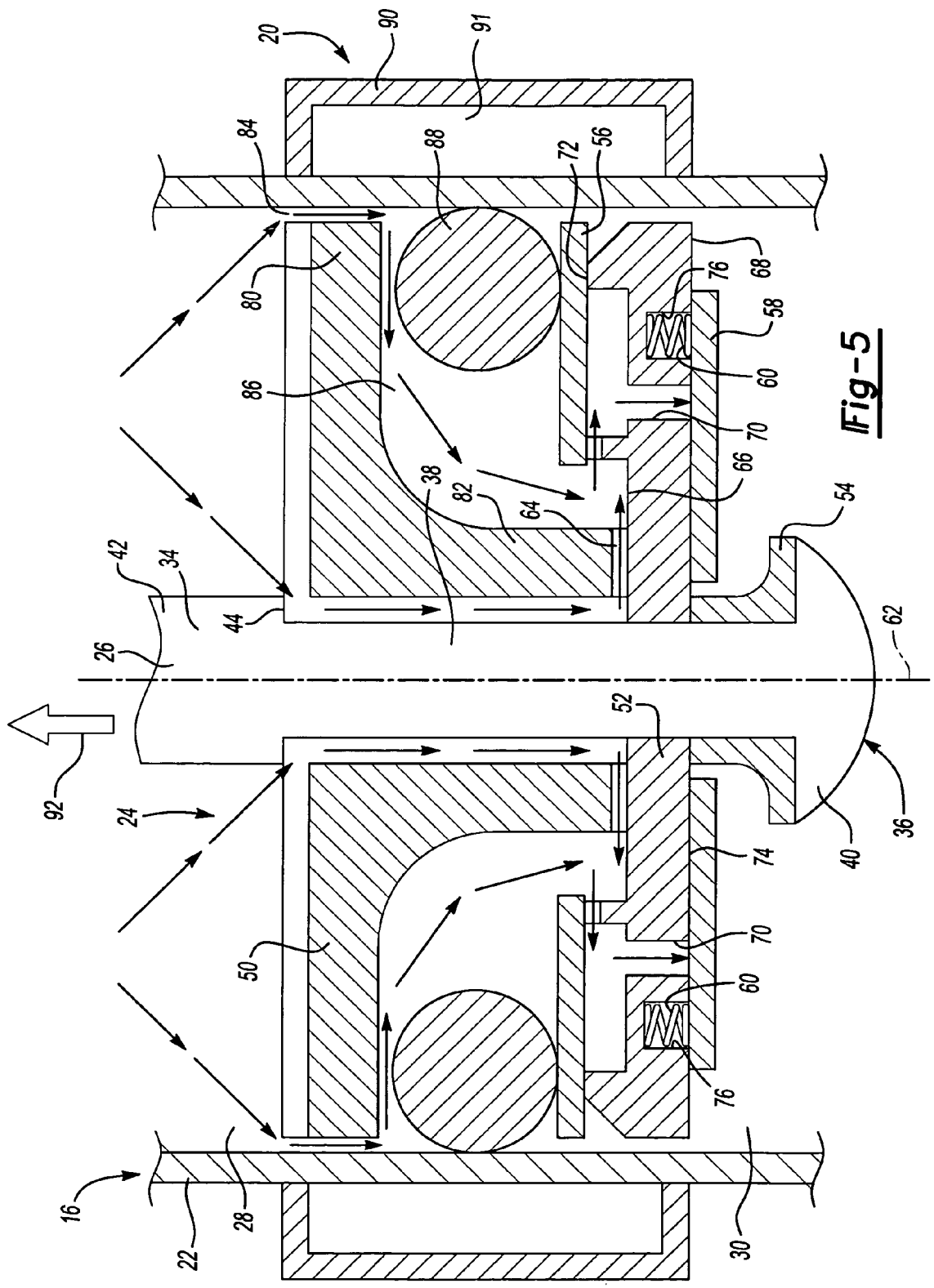
FIG. 5 is similar to FIG. 4 but shows the piston valve in a closed position.

When the rod 26 is extended from the fully compressed position toward the fully extended position, the magnetic valve member 50 passes through the magnetic collar 90. A magnetic field generated between the magnetic valve member 50 and the magnetic collar 90 attracts the intermediate stop plate 58 toward the orifice plate 52 to close the openings 70, as shown in FIG. 5. Thus, the intermediate stop plate 58 is in direct engagement with the second abutment surface 74 of the orifice plate 52. This stops gas flow from the extension chamber 28 into the compression chamber 30, which in turn stops the gas spring assembly 16 at the intermediate stop position.

It should be understood that the magnetic collar 90, magnetic valve member 50, and orifice plate 52, and intermediate stop plate 58 can be made out of any type of materials needed to provide sufficient magnetic force to attract the intermediate stop plate 58 to the orifice plate 52, as the magnetic valve member 50 passes through the magnetic collar 90.

Once the gas spring assembly 16 is in the intermediate stop position, the end user can then exert a manual input force to break the magnetic hold to move the liftgate 12 from the intermediate stop position up to the fully open position. The manual input force generates a high pressure on a rod side of the piston assembly 24. After sufficient pressure is generated, the magnetic valve member 50 is forced open and the piston assembly 24 moves beyond the magnetic field generated by the magnetic collar 90.

Figure 6:
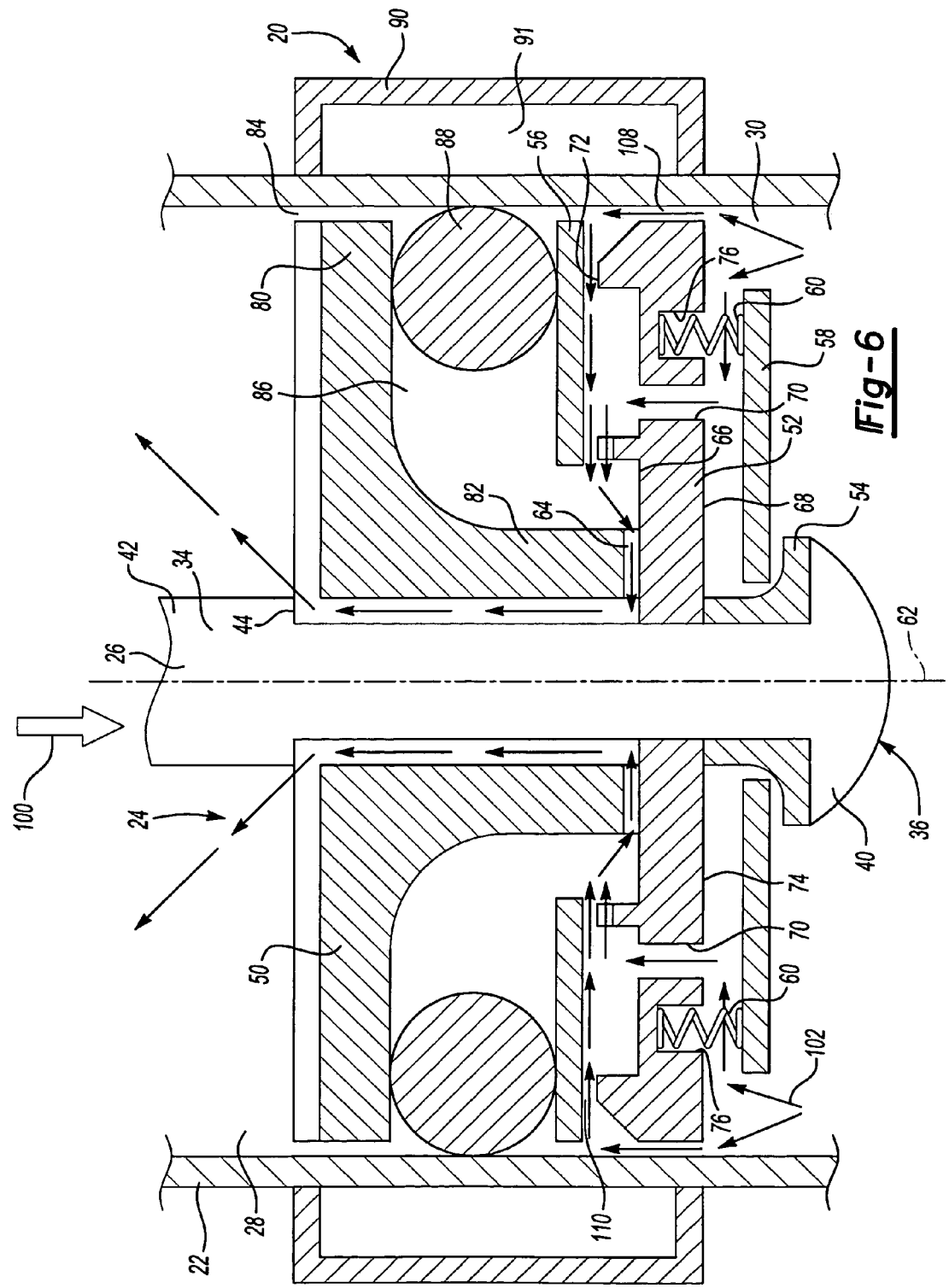
FIG. 6 is similar to FIG. 4 but shows the gas spring assembly in a compression position with the piston valve in the open position.

FIG. 6 shows the rod 26 being moved from the fully extended position toward the fully compressed condition as indicated by arrow 100. Gas flows from the compression chamber 30 to the extension chamber 28 along a second flow path as indicated by the arrows 102.

Gas flows from the compression chamber 30 around an outer surface of the intermediate stop plate 58, between the second side 68 of the orifice plate 52 and the intermediate stop plate 58, through the openings 70, between the first side 66 of the orifice plate 52 and the shuttle disc 56, into gap 64, between the outer surface of the shaft portion 38 of the rivet 36 and the inner surface of stem portion 82, and out into the extension chamber 28. Gas also flows into a gap 108 formed between an outer surface of the orifice plate 52 and the tube 22, and into a gap 110 between the first abutment surface 72 of the orifice plate and the shuttle disc 56, and then joins the gas flowing from the openings 70.

The seal 88 is compressed between the base portion 80 of the magnetic valve member 50 and the shuttle disc 56 to seal flow path that extends around the outer circumference of the magnetic valve member 50.

Figure 7:
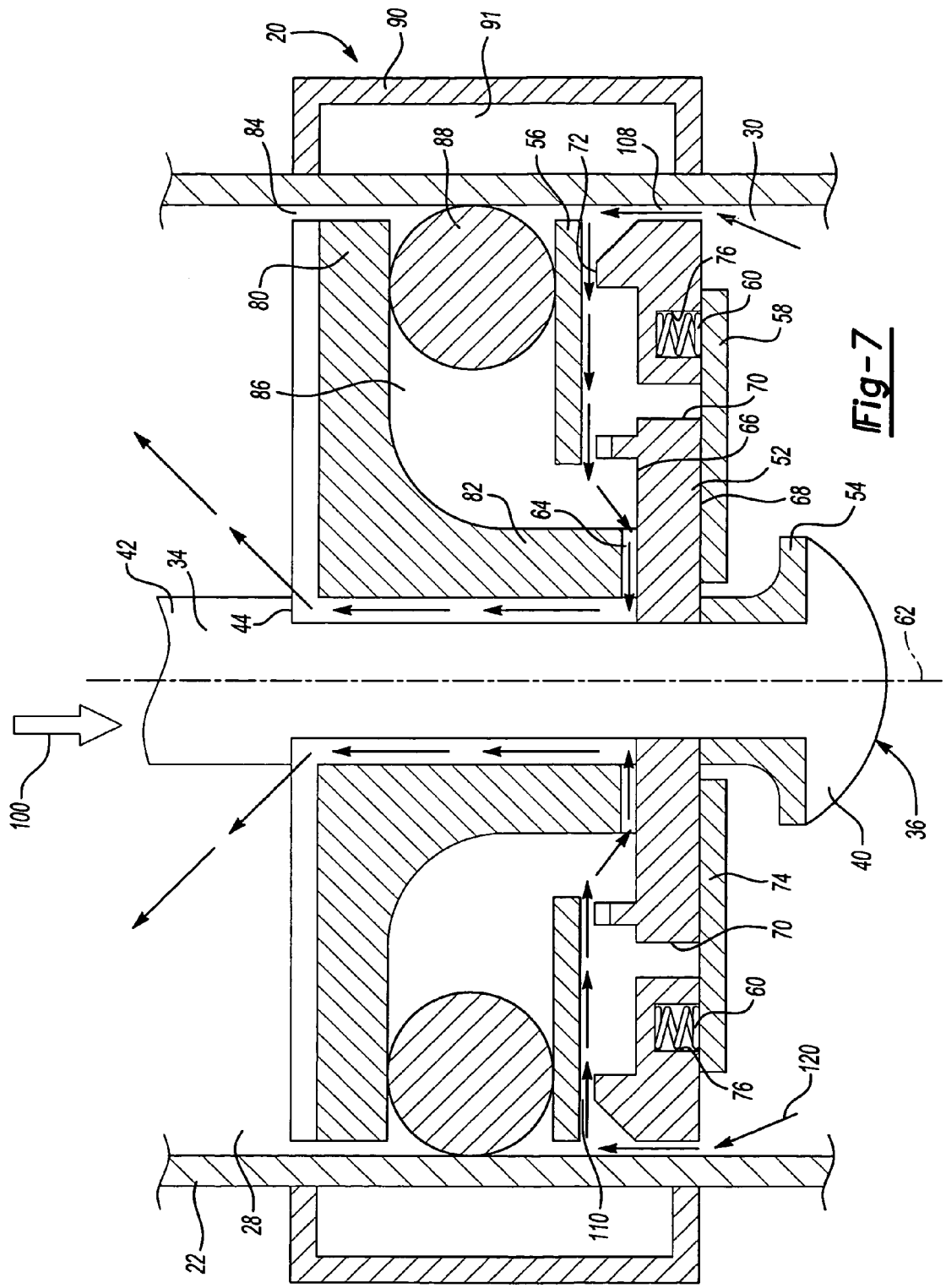
FIG. 7 is similar to FIG. 6 but shows the piston valve in the closed position.

When the rod 26 is moved from the fully extended position toward the fully compressed position, the magnetic valve member 50 passes through the magnetic collar 90. The magnetic field generated by the magnetic collar 90 attracts the intermediate stop plate 58 toward the orifice plate 52 to close the openings 70, as shown in FIG. 7. However, a bypass flow path, indicated by arrow 120 allows the gas spring assembly 16 to be compressed without stopping at the intermediate stop position.

The bypass flow path extends around the intermediate stop plate 58 into the gap 108 formed between the outer surface of the orifice plate 52 and the tube 22, into the gap 110 between the first abutment surface 72 of the orifice plate and the shuttle disc 56, then flows into gap 64, and then flows between the outer surface of the shaft portion 38 of the rivet 36 and the inner surface of stem portion 82, and out into the extension chamber 28. Thus, the liftgate 12 can be closed without the interruption of stopping at the intermediate stop position.

Figure 8:
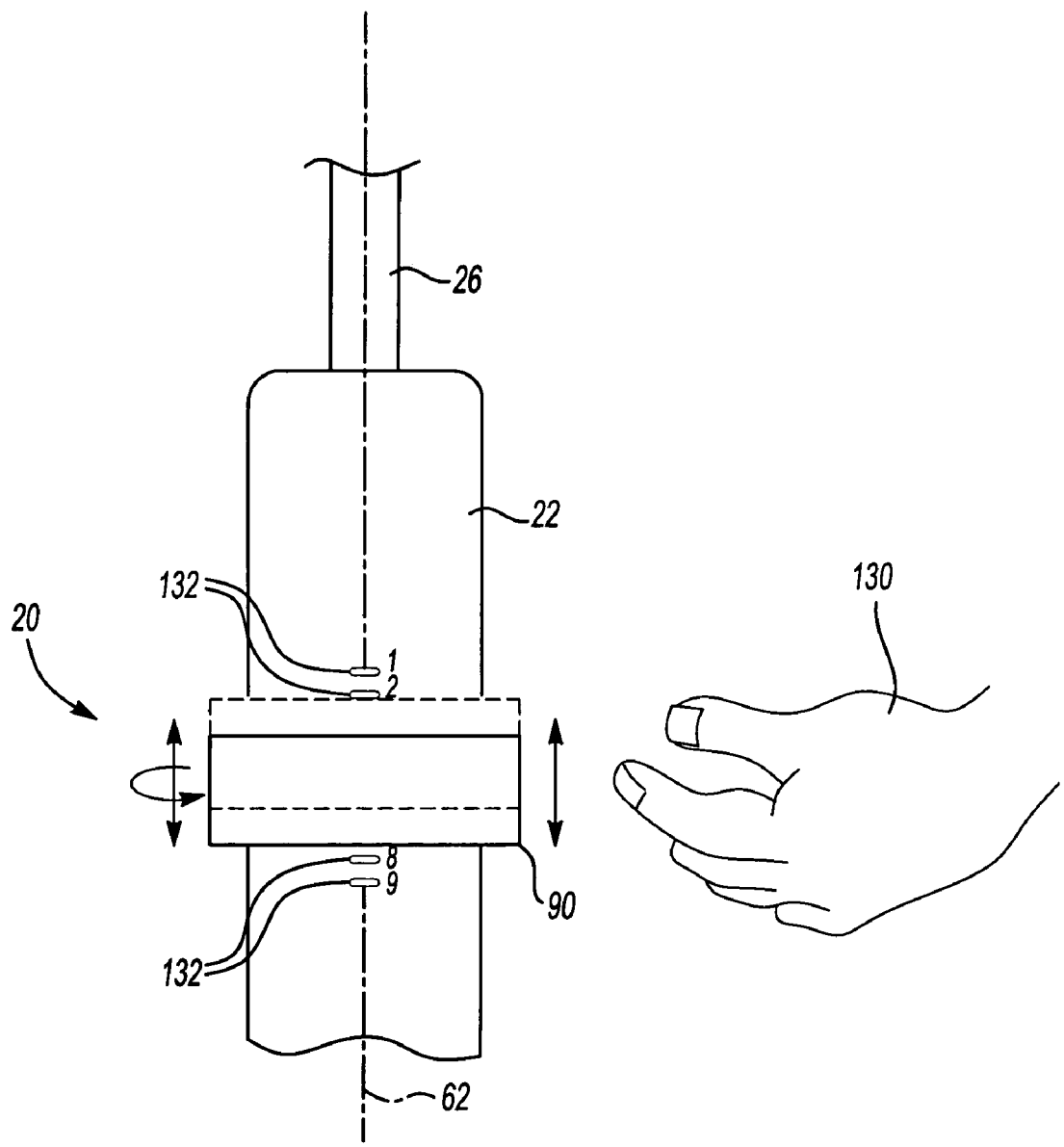
FIG. 8 is schematic view showing selective adjustment of an adjuster mechanism of the gas spring assembly.

As shown in FIG. 8, an end user 130 can selectively move the magnetic collar 90 relative to the tube 22 to set the intermediate stop position at a desired location. Any type of attachment method can be used to couple the magnetic collar to the tube 22 to allow the magnetic collar 90 to be rotated about the longitudinal axis 62 and/or axially translated along the longitudinal axis 62. Different intermediate stop positions, indicated with dashed lines, can be identified with markings 132 formed on or attached to the tube 22.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas spring assembly comprising:
a tube;
a rod axially moveable relative to said tube between a fully extended position and a fully compressed position;
a piston assembly received within said tube and separating said tube into a compression chamber and an extension chamber, said piston assembly being coupled to said rod wherein said piston assembly controls gas flow between said compression and extension chambers as said rod moves between said fully extended and fully compressed positions; and
an adjuster mechanism cooperating with said piston assembly to provide an intermediate stop position between said fully extended position and said fully compressed position wherein said adjuster mechanism is adapted for selective adjustment by a user to place said intermediate stop position at a desired location and wherein said adjuster mechanism comprises an adjustable magnetic collar that is mounted to an outer circumferential surface of said tube and is movable relative to said tube during user adjustment of said intermediate stop position and is fixed for movement with said tube once said intermediate stop position is set at said desired location.

2. A gas spring assembly comprising:
a tube;
a rod axially moveable relative to said tube between a fully extended position and a fully compressed position;
a piston assembly received within said tube and separating said tube into a compression chamber and an extension chamber, said piston assembly being coupled to said rod wherein said piston assembly controls gas flow between said compression and extension chambers as said rod moves between said fully extended and fully compressed positions; and
an adjuster mechanism cooperating with said piston assembly to provide an intermediate stop position between said fully extended position and said fully compressed position wherein said adjuster mechanism is adapted for selective adjustment by a user to place said intermediate stop position at a desired location, and wherein said adjuster mechanism comprises an adjustable magnetic collar that at least partially surrounds an outer surface of said tube.

3. The gas spring assembly according to claim 2 wherein said piston assembly includes a magnetic valve member that cooperates with a magnet in said adjustable magnetic collar to stop gas flow from said extension chamber to said compression chamber and to hold the gas spring assembly in said intermediate stop position as said rod is moved from said fully compressed position toward said fully extended position.

4. The gas spring assembly according to claim 3 wherein said piston assembly includes a bypass that allows gas flow from said compression chamber to said extension chamber to avoid stopping at said intermediate stop position as said magnetic valve member passes through said magnet when said rod is moved from said fully extended position toward said fully compressed position.

5. The gas spring assembly according to claim 1 wherein said rod defines a longitudinal axis and wherein said piston assembly comprises:
a valve member fixed to one end of said rod,
an orifice plate fixed to said one end of said rod and axially spaced apart from said valve member along said longitudinal axis,
an intermediate stop plate mounted for movement relative to a first side of said orifice plate, and
a shuttle disc mounted for movement relative to a second side of said orifice plate opposite said first side wherein a first flow path provides gas flow from said extension chamber to said compression chamber as said rod is extended from said tube and wherein a second flow path different from said first flow path provides gas flow from said compression chamber to said extension chamber as said rod is moved toward said fully compressed position.

6. The gas spring assembly according to claim 5 including at least one seal positioned axially between said valve member and said shuttle disc in a direction extending generally along said longitudinal axis.

7. The gas spring assembly according to claim 6 wherein said at least one seal comprises an O-ring that is adapted to move with said shuttle disc.

8. A gas spring assembly comprising:

a tube;

a rod axially moveable relative to said tube between a fully extended position and a fully compressed position, said rod defining a longitudinal axis;

a piston assembly received within said tube and separating said tube into a compression chamber and an extension chamber, said piston assembly being coupled to said rod wherein said piston assembly controls gas flow between said compression and extension chambers as said rod moves between said fully extended and fully compressed positions, and wherein said piston assembly comprises:

a valve member fixed to one end of said rod, wherein said valve member comprises a magnetic valve, an orifice plate fixed to said one end of said rod and axially spaced apart from said valve member along said longitudinal axis, an intermediate stop plate mounted for movement relative to a first side of said orifice plate, and a shuttle disc mounted for movement relative to a second side of said orifice plate opposite said first side wherein a first flow path provides gas flow from said extension chamber to said compression chamber as said rod is extended from said tube and wherein a second flow path different from said first flow path provides gas flow from said compression chamber to said extension chamber as said rod is moved toward said fully compressed position; and an adjuster mechanism cooperating with said piston assembly to provide an intermediate stop position between said fully extended position and said fully compressed position wherein said adjuster mechanism is adapted for selective adjustment by a user to place said intermediate stop position at a desired location, and wherein said adjuster mechanism comprises an adjustable magnetic collar with said intermediate stop plate being magnetically attracted to said orifice plate as said piston assembly passes through a magnet in said adjustable magnetic collar to close said first flow path and hold the gas spring assembly in said intermediate stop position.

9. The gas spring assembly according to claim 8 wherein said magnetic valve is opened in response to generation of a high pressure force that forces said intermediate stop plate away from said orifice plate to re-open said first flow path and allow the gas spring assembly to move from said intermediate stop position toward said fully extended position.

10. The gas spring assembly according to claim 9 wherein said high pressure force is generated by a manual input load from the user.

11. The gas spring assembly according to claim 8 wherein said first flow path begins at said extension chamber and extends around inner and outer surfaces of said magnetic valve, extends between said shuttle disc and said orifice plate, extends through at least one opening in said orifice plate, and extends around an outer surface of said intermediate stop plate into said compression chamber.

12. The gas spring assembly according to claim 8 wherein said second flow path begins at said compression chamber and extends around an outer surface of said intermediate stop plate, extends around an outer surface of said orifice plate and through at least one opening in said orifice plate, extends between said shuttle disc and said orifice plate, and extends between an inner surface of said magnetic valve and said rod into said extension chamber.

13. The gas spring assembly according to claim 12 wherein said second flow path includes a bypass flow path to avoid having the gas spring assembly stop at said intermediate stop position as the gas spring assembly is moved from said fully extended position toward said fully compressed position, said bypass flow path extending around said outer surface of said intermediate stop plate, around said outer surface of said orifice plate, between said shuttle disc and said orifice plate, and between said inner surface of said magnetic valve and said rod into said extension chamber.

14. A gas assembly comprising:

a tube;

a rod axially moveable relative to said tube between a fully extended position and a fully compressed position, said rod defining a longitudinal axis;

a piston assembly received within said tube and separating said tube into a compression chamber and an extension chamber, said piston assembly being coupled to said rod wherein said piston assembly controls gas flow between said compression and extension chambers as said rod moves between said fully extended and fully compressed positions, and wherein said piston assembly comprises;

a valve member fixed to one end of said rod;

an orifice plate fixed to said one end of said rod and axially spaced apart from said valve member along said longitudinal axis, an intermediate stop plate, resiliently coupled to said orifice plate such that the intermediate stop plate is mounted for movement relative to a first side of said orifice plate, and a shuttle disc mounted for movement relative to a second side of said orifice plate opposite said first side wherein a first flow path provides gas flow from said extension chamber to said compression chamber as said rod is extended from said tube and wherein a second flow path different from said first flow provides gas flow from said compressed chamber to said extension chamber as said rod is moved toward said fully compressed position; and an adjuster mechanism cooperating with said piston assembly to provide an intermediate stop position between said fully extended position and said fully compressed position wherein said adjuster mechanism comprises an adjustable magnetic collar that is adapted for selective adjustment by a user to place said intermediate stop position at a desired location.

15. A gas spring assembly comprising:

a tube;

a rod axially moveable relative to said tube between a fully extended position and a fully compressed position wherein one of said rod and said tube is adapted for mounting to one of a vehicle body and a movable body panel member and the other of said rod and said tube is adapted for mounting to the other of the vehicle body and the movable body panel member;

a piston assembly received within said tube and separating said tube into a compression chamber and an extension chamber, said piston assembly being coupled to said rod wherein said piston assembly controls gas flow between said compression and extension chambers as said rod moves between said fully extended and fully compressed positions; and an adjuster mechanism cooperating with said piston assembly to provide an intermediate stop position between said fully extended position and said fully compressed position wherein said adjuster mechanism is adapted for selective adjustment by a user to place said intermediate stop position at a desired location, and wherein during opening and closing movement of the movable body panel member relative to the vehicle body a magnetic force signal is generated to stop movement of the gas spring assembly at the intermediate stop position.

16. A method for controlling movement of a gas spring assembly comprising:
   (a) mounting a piston assembly within a tube to separate the tube into compression and extension chambers;
   (b) operably connecting a rod to the piston assembly such that the rod and piston assembly move together between a fully extended position and a fully compressed position;
   (c) selectively adjusting an external adjuster mechanism that cooperates with the piston assembly to provide an intermediate stop position at a desired location between the fully extended position and the fully compressed position; and
   (d) generating a magnetic force to close a valve member in the piston assembly to hold the gas spring assembly in the intermediate stop position.

17. The method according to claim 16 wherein the external adjuster mechanism comprises a magnetic collar that is supported on an external surface of the tube and step (c) includes axially adjusting a position of the magnetic collar relative to the tube to adjust a location of the intermediate stop position.

18. The gas spring assembly according to claim 1 wherein said adjuster mechanism is selectively movable between a plurality of different adjustment positions, each adjustment position corresponding to a unique intermediate stop position, to allow each user of the gas spring assembly to select a different intermediate stop position.

19. The gas spring assembly according to claim 18 including a plurality of markings, with each marking identifying one of the different intermediate stop positions, and wherein said adjuster mechanism is movable in relation to the plurality of markings to provide the intermediate stop position at the desired location.

20. The gas spring assembly according to claim 1 wherein said adjuster mechanism comprises an adjustable intermediate stop mechanism that provides a plurality of discrete fixed intermediate stop positions that can be selected by the user, with each of the plurality of discrete fixed intermediate stop positions providing a different fixed rest position at a location between the fully extended position and the fully compressed position.

21. The method according to claim 1 wherein the external adjuster mechanism comprises an adjustable intermediate stop mechanism that provides a plurality of discrete fixed intermediate stop positions between the fully extended and the fully compressed positions that can be selected by the user, and wherein each of the plurality of discrete fixed intermediate stop positions provides a different fixed rest position at a location between the fully extended position and the fully compressed position.

22. The gas spring assembly according to claim 1 wherein the gas spring assembly generates an internal signal to stop and hold the gas spring assembly at said intermediate stop position.

23. A gas spring assembly comprising:
   a tube;
   a rod axially moveable relative to said tube between a fully extended position and a fully compressed position;
   a piston assembly received within said tube and separating said tube into a compression chamber and an extension chamber, said piston assembly being coupled to said rod wherein said piston assembly controls gas flow between said compression and extension chambers as said rod moves between said fully extended and fully compressed positions; and
   an adjuster mechanism cooperating with said piston assembly to provide an intermediate stop position between said fully extended position and said fully compressed position wherein said adjuster mechanism is adapted for selective adjustment by a user to place said intermediate stop position at a desired location, and wherein the gas spring assembly generates an internal signal to stop and hold the gas spring assembly at said intermediate stop position, said internal signal comprising a magnetic force signal that halts movement of said piston assembly within said tube and holds the gas spring assembly in the intermediate stop position.

* * * * *

UNITED STATES PATENT AND TRADEMARK OFFICE
CERTIFICATE OF CORRECTION

| | |
|---|---|
| PATENT NO. | : 7,614,616 B2 |
| APPLICATION NO. | : 11/154778 |
| DATED | : November 10, 2009 |
| INVENTOR(S) | : Bauman et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 495 days.

Signed and Sealed this

Nineteenth Day of October, 2010

David J. Kappos
*Director of the United States Patent and Trademark Office*